(12) United States Patent
Ryu et al.

(10) Patent No.: US 10,547,037 B2
(45) Date of Patent: Jan. 28, 2020

(54) BATTERY MODULE, AND BATTERY PACK AND VEHICLE COMPRISING THE SAME

(71) Applicant: LG CHEM, LTD., Seoul (KR)

(72) Inventors: Jae-Uk Ryu, Daejeon (KR); Jeong-O Mun, Daejeon (KR); Yoon-Koo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 131 days.

(21) Appl. No.: 15/743,360

(22) PCT Filed: Mar. 16, 2017

(86) PCT No.: PCT/KR2017/002852
§ 371 (c)(1),
(2) Date: Jan. 10, 2018

(87) PCT Pub. No.: WO2017/217641
PCT Pub. Date: Dec. 21, 2017

(65) Prior Publication Data
US 2018/0205053 A1 Jul. 19, 2018

(30) Foreign Application Priority Data
Jun. 13, 2016 (KR) .................. 10-2016-0073360

(51) Int. Cl.
*H01M 2/10* (2006.01)
*H01M 2/20* (2006.01)
(Continued)

(52) U.S. Cl.
CPC ........... *H01M 2/1077* (2013.01); *B60L 50/50* (2019.02); *B60L 50/64* (2019.02); *C22C 21/00* (2013.01);
(Continued)

(58) Field of Classification Search
CPC ...... H01M 2/1077; H01M 2/10; H01M 2/206; H01M 2/26; H01M 2/266; B60L 50/50; B60L 50/64; C22C 21/00
See application file for complete search history.

(56) References Cited

U.S. PATENT DOCUMENTS

2003/0190522 A1  10/2003  Ogata
2008/0199765 A1  8/2008  Yoon et al.
(Continued)

FOREIGN PATENT DOCUMENTS

JP  2003-297334 A  10/2003
JP  2005-302383 A  10/2005
(Continued)

OTHER PUBLICATIONS

International Search Report (PCT/ISA/210) issued in PCT/KR2017/002852, dated Jun. 27, 2017.
(Continued)

*Primary Examiner* — Helen Oi K Conley
(74) *Attorney, Agent, or Firm* — Birch, Stewart, Kolasch & Birch, LLP

(57) ABSTRACT

Disclosed is a battery module, which includes battery cells having electrode leads and a connection member for connecting the battery cells, wherein the battery cells are classified into a first battery group having battery cells disposed side by side in a first direction and a second battery group having battery cells disposed side by side in the first direction so that electrode leads of the battery cells thereof face electrode leads of the battery cells of the first battery group, wherein the connection member is located between the first and second battery groups, wherein the electrode leads of the battery cells are connected to the connection member, respectively, wherein an electrode lead of any one battery cell of the first battery group is in contact with any one of an upper surface and a lower surface of the connec-
(Continued)

tion member, and wherein an electrode lead of a facing battery cell of the second battery group, which is located to face the any one battery cell, is in contact with the other one of the upper surface and the lower surface of the connection member.

11 Claims, 7 Drawing Sheets

(51) Int. Cl.
*H01M 2/26* (2006.01)
*C22C 21/00* (2006.01)
*B60L 50/50* (2019.01)
*B60L 50/64* (2019.01)

(52) U.S. Cl.
CPC ............. *H01M 2/10* (2013.01); *H01M 2/20* (2013.01); *H01M 2/206* (2013.01); *H01M 2/26* (2013.01); *H01M 2/266* (2013.01); *H01M 2220/20* (2013.01); *Y02T 10/7016* (2013.01)

(56) References Cited

U.S. PATENT DOCUMENTS

| | | |
|---|---|---|
| 2011/0076546 A1 | 3/2011 | Choi et al. |
| 2012/0288744 A1 | 11/2012 | Guen |
| 2013/0273411 A1 | 10/2013 | Kim |
| 2015/0050523 A1 | 2/2015 | Lee |
| 2015/0064507 A1 | 3/2015 | Koh |
| 2016/0172648 A1 | 6/2016 | Park et al. |
| 2016/0197332 A1 | 7/2016 | Lee et al. |
| 2017/0200926 A1 | 7/2017 | Motokawa et al. |

FOREIGN PATENT DOCUMENTS

| | | |
|---|---|---|
| KR | 10-2008-0022915 A | 3/2008 |
| KR | 10-2012-0123172 A | 11/2012 |
| KR | 10-2012-0125874 A | 11/2012 |
| KR | 10-2015-0022459 A | 3/2015 |
| KR | 10-1613499 B1 | 4/2016 |
| WO | WO 2016/031208 A1 | 3/2016 |

OTHER PUBLICATIONS

English machine translation for KR-10-2015-0022459-A dated Mar. 4, 2015.

US 10,547,037 B2

BATTERY MODULE, AND BATTERY PACK AND VEHICLE COMPRISING THE SAME

TECHNICAL FIELD

The present disclosure relates to a battery module, and a battery pack and a vehicle comprising the same.

The present application claims priority to Korean Patent Application No. 10-2016-0073360 filed on Jun. 13, 2016 in the Republic of Korea, the disclosures of which are incorporated herein by reference.

BACKGROUND ART

Secondary batteries are highly applicable to a wide range of products and have electrical characteristics with high energy density. Such secondary batteries are applied not only to portable electronic devices but also to electric vehicles, hybrid vehicles, and electric power storage devices, driven by electric driving sources.

A battery pack applied to an electric vehicle and the like is configured so that a plurality of battery modules, each having a plurality of battery cells, are connected to obtain a high output. Each battery cell may be repeatedly charged and discharged by an electrochemical reaction among components including a positive electrode current collector, a negative electrode current collector, a separator, an active material, an electrolyte and the like.

Meanwhile, along with an increased need for a large capacity structure and utilization as energy storage sources in recent years, there is a growing demand for a multi-module battery pack in which a plurality of battery modules, each having a plurality of secondary batteries connected in series or in parallel, are aggregated.

Generally, a battery module applied to a battery pack is configured by stacking a plurality of battery cells and then connecting the plurality of battery cells in series or in parallel.

For the electric connection of the battery cells, electrode leads of the battery cells may be bent in any direction and then coupled to each other by welding. Generally, the plurality of battery cells are disposed side by side in one direction. At this time, the electrode leads of the battery cells are also disposed side by side in one direction at any surface of the battery cells. After that, the electrode leads are coupled in an upper or lower space of one surface of the battery cells. In this case, in order to couple the plurality of electrode leads, a separate space (the upper or lower space of the battery cells) is required for coupling the electrode leads to the battery module, and this space occupies a certain volume in the battery module, which is disadvantageous in terms of the energy volume efficiency of the battery module.

DISCLOSURE

Technical Problem

The present disclosure is designed to solve the problems of the related art, and therefore the present disclosure is directed to providing a battery module for enhancing the energy volume efficiency of the battery module, and a battery pack and a vehicle comprising the battery module.

In addition, the present disclosure is directed to providing a battery module which may enhance the energy volume efficiency of the battery module by newly configuring and disposing battery cells and a connection member for electrically connecting the battery cells, and a battery pack and a vehicle comprising the battery module.

The present disclosure is not limited thereto, and other objects not mentioned herein may be clearly understood by those skilled in the art from the following description.

Technical Solution

The present disclosure provides a battery module having a plurality of battery cells.

According to an embodiment of the present disclosure, the battery module includes: a plurality of battery cells, each having an electrode assembly, a case for accommodating the electrode assembly, and an electrode lead composed of a positive electrode lead and a negative electrode lead connected to the electrode assembly and exposed out of the case; and a connection member configured to electrically connect the battery cells, wherein the plurality of battery cells are classified into a first battery group having battery cells disposed side by side in a first direction and a second battery group having battery cells disposed side by side in the first direction so that electrode leads of the battery cells thereof face electrode leads of the battery cells of the first battery group, wherein the connection member is located between the first battery group and the second battery group, wherein the electrode leads of the battery cells are connected to the connection member, respectively, wherein an electrode lead of any one battery cell of the first battery group is in contact with any one of an upper surface and a lower surface of the connection member, and wherein an electrode lead of a battery cell of the second battery group, which is located to face the any one battery cell, is in contact with the other one of the upper surface and the lower surface of the connection member.

In an embodiment, the battery cell may include an accommodation portion in which the electrode assembly is accommodated and a sealing portion for sealing the accommodation portion, the connection member and the electrode lead may be coupled by means of welding, and a welding face of the connection member and the electrode lead may be located in a region facing the sealing portion.

In an embodiment, the welding face of the electrode lead of the any one battery cell and the connection member may be located in a region facing the sealing portion of the other battery cell.

In an embodiment, the welding face of the electrode lead of the other battery cell and the connection member may be located in a region facing the sealing portion of the any one battery cell.

In an embodiment, the case may include an upper pouch and a lower pouch whose rim portions are sealed to each other, the accommodation space for accommodating the electrode assembly may be formed in any one of the upper pouch and the lower pouch, and in case of battery cells connected to each other by the connection member, the accommodation space may be formed in different pouches.

In an embodiment, the positive electrode lead and the negative electrode lead of the battery cell may be exposed at the same side of the case, and at least the positive electrode lead and the negative electrode lead of the any one battery cell may be located so that a partial region of surfaces thereof faces the positive electrode lead and the negative electrode lead of the other battery cell, based on the connection member.

In an embodiment, both ends of the connection member in a second direction, which is perpendicular to the first direction when being observed from the above, may be spaced apart by a predetermined distance from the accommodation portions of both battery cells connected to each other by the connection member.

In an embodiment, at least a part of the lower surface of the connection member may be in contact with one surface of the sealing portion of the any one battery cell, and at least a part of the upper surface of the connection member may be in contact with one surface of the sealing portion of the facing battery cell.

In an embodiment, the battery module may have an inner space, and a cell frame may be further provided so that the first battery group, the second battery group and the connection member are located in the inner space.

The present disclosure may provide a battery pack, comprising the battery module described above.

The present disclosure may provide a vehicle, comprising the battery pack described above.

Advantageous Effects

According to an embodiment of the present disclosure, the energy volume efficiency of the battery module may be improved by coupling electrode leads of the battery cells and a connection member in different ways.

In addition, according to an embodiment of the present disclosure, the space required for coupling the electrode leads may be minimized since the electrode leads of the battery cells are respectively coupled to an upper surface and a lower surface of the connection member.

The effects of the present disclosure are not limited to the above, and effects not mentioned herein may be clearly understood by those skilled in the art from the specification and the accompanying drawings.

BEST MODE

Hereinafter, embodiments of the present disclosure will be described in more detail with reference to the accompanying drawings. The embodiments of the present disclosure may be modified in various ways, and the scope of the present disclosure should not be construed as being limited to the embodiments described below. The embodiments are provided to more fully illustrate the present disclosure to those skilled in the art. Thus, the shapes of the components in the figures may be exaggerated to emphasize a clearer description. In addition, terms and words used in the specification and the claims should not be construed as being limited to ordinary or dictionary meanings, but interpreted based on the meanings and concepts corresponding to technical aspects of the present disclosure on the basis of the principle that the inventor is allowed to define terms appropriately for the best explanation.

Figure 1:
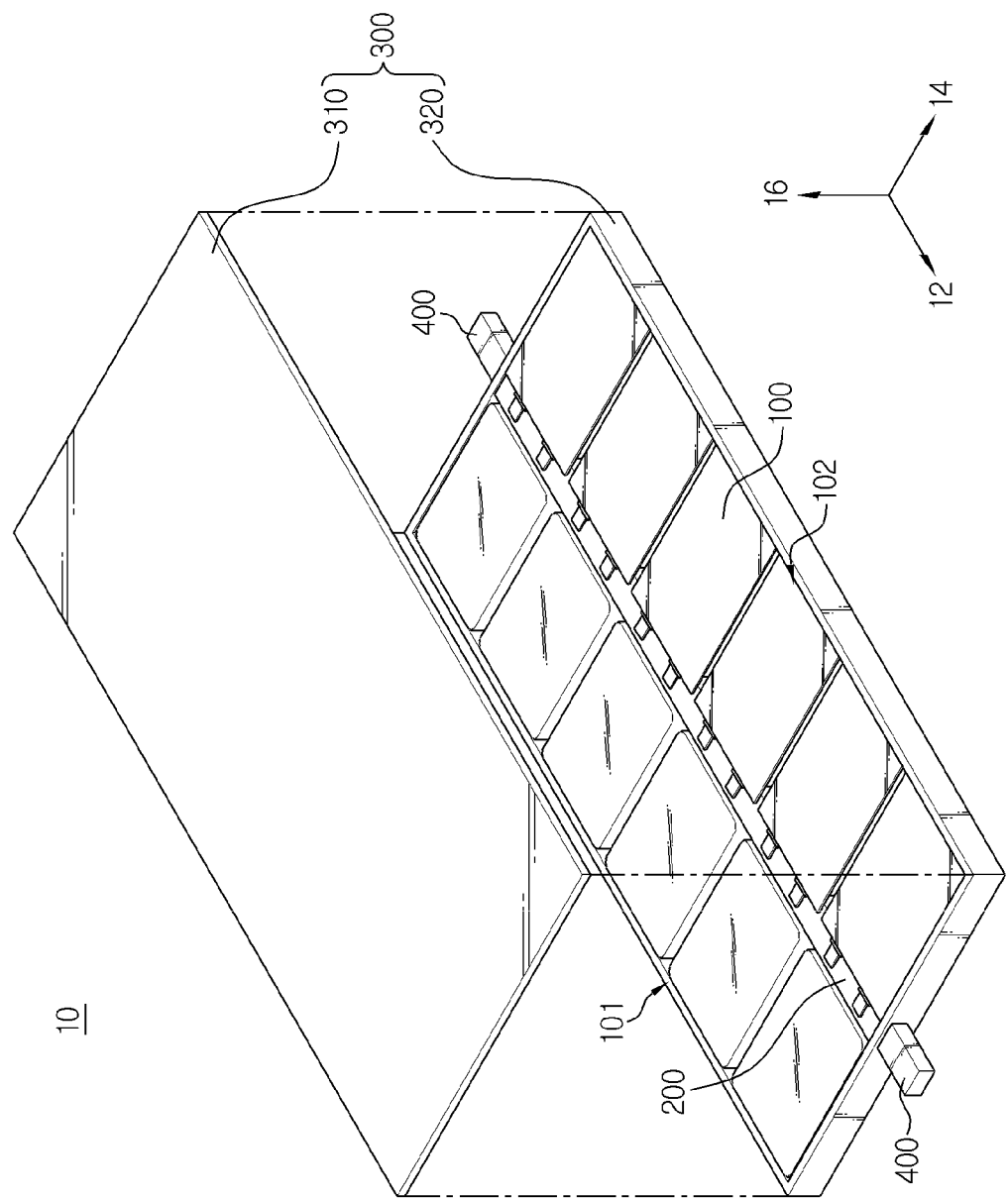
FIG. 1 is an exploded perspective view showing a battery module according to an embodiment of the present disclosure.
Figure 2:
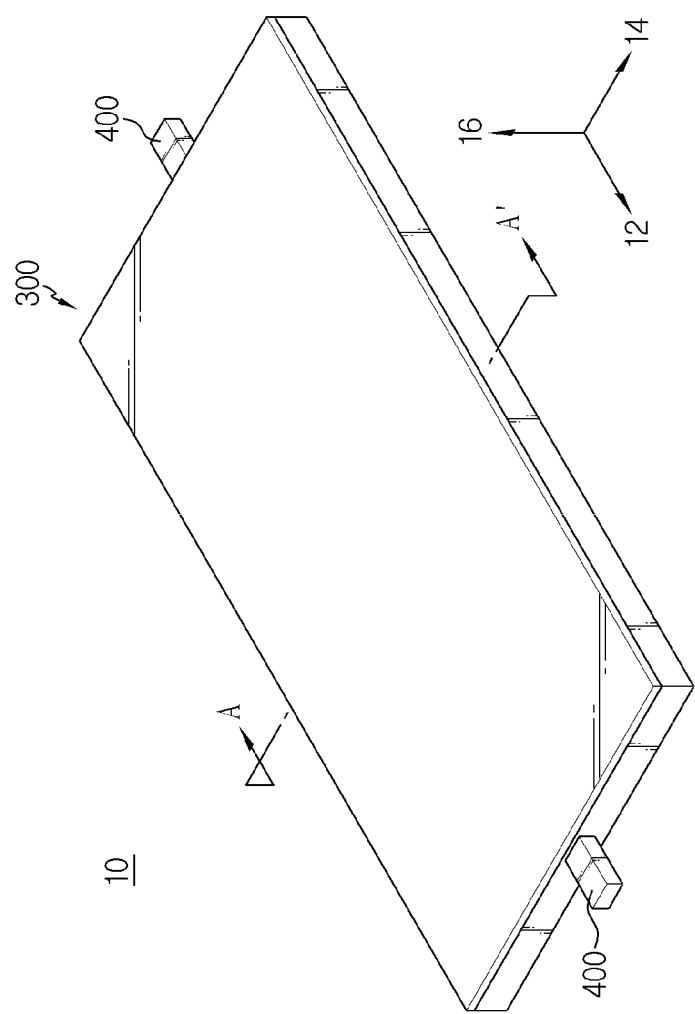
FIG. 2 is a perspective view showing a battery module according to an embodiment of the present disclosure in an assembled state.
Figure 3:
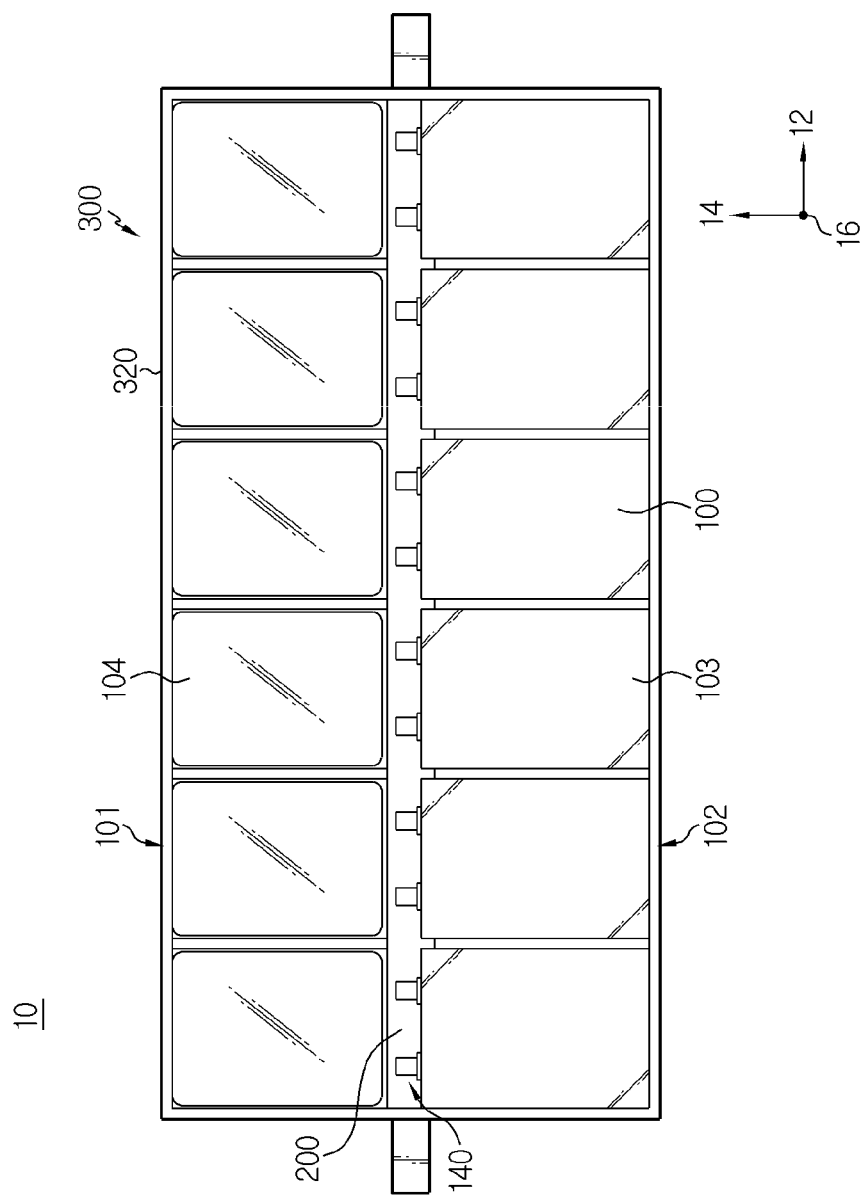
FIG. 3 is a plane view showing the battery module of FIG. 1, from which the upper body of the cell frame is excluded.

FIG. 1 is an exploded perspective view showing a battery module according to an embodiment of the present disclosure, FIG. 2 is a perspective view showing a battery module according to an embodiment of the present disclosure in an assembled state, and FIG. 3 is a plane view showing the battery module of FIG. 1, from which the upper body of the cell frame is excluded.

Referring to FIGS. 1 to 3, a battery module 10 has a plurality of battery cells 100. The battery cell 100 may be provided as a secondary battery. For example, the battery cell 100 may be provided as a pouch-type secondary battery. Hereinafter, the battery cell 100 of the present disclosure will be described as a pouch-type secondary battery as an example.

The battery module 10 includes a battery cell 100, a connection member 200, a cell frame 300 and a connector 400.

The battery cell 100 may be provided in plural. The plurality of battery cells 100 are classified into a first battery group 101 and a second battery group 102.

The battery cells 100 of the first battery group 101 may be disposed side by side in the first direction 12. Here, a direction in which the plurality of battery cells 100 of the first battery group 101 are arranged side by side is referred to as a first direction 12. When being observed from the above, a direction perpendicular to the first direction 12 is referred to as a second direction 14. A direction perpendicular to both the first direction 12 and the second direction 14 is referred to as a third direction 16.

The battery cells 100 of the second battery group 102 may be disposed side by side in the first direction 12. The first battery group 101 and the second battery group 102 may be spaced apart from each other by a predetermined distance in the second direction 14. The first battery group 101 and the second battery group 102 may be located so that the electrode leads 140 of the battery cells 100 thereof face each other. In an embodiment of the present disclosure, the first battery group 101 and the second battery group 102 respectively include six battery cells 100 as an example, but the number of the battery cells 100 is not limited thereto.

Figure 4:
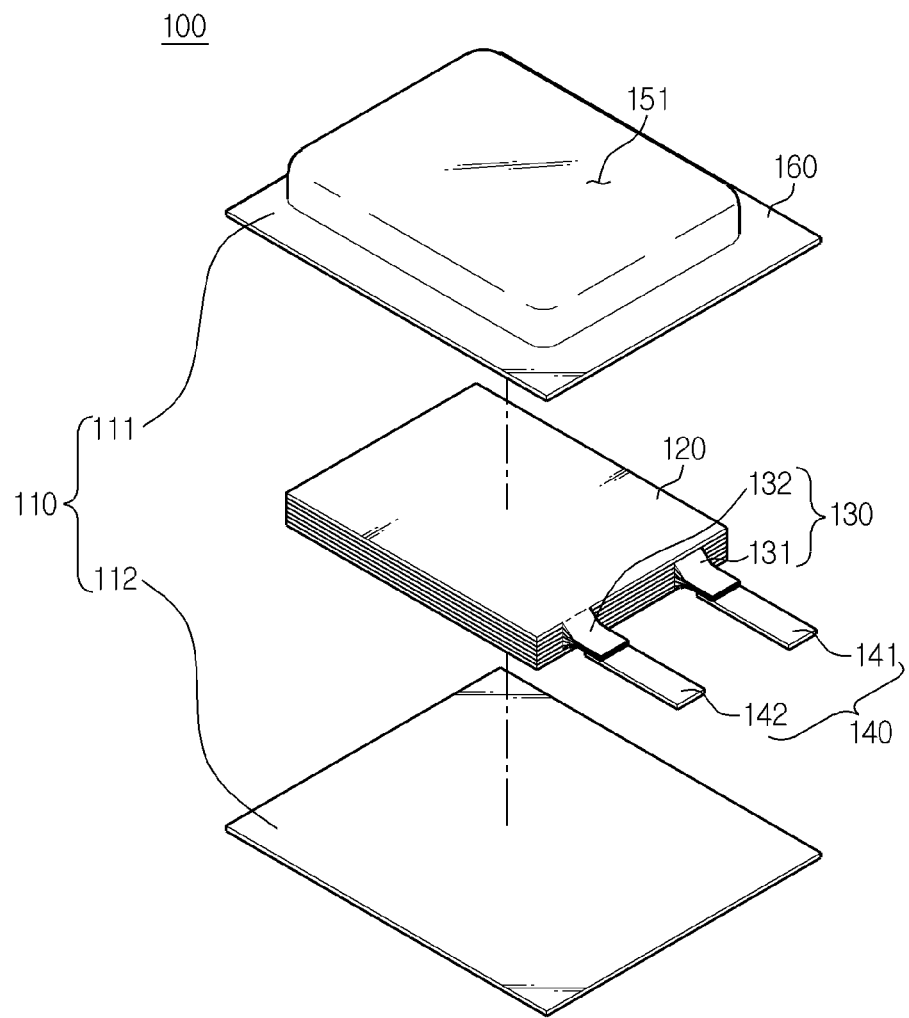
FIG. 4 is an exploded perspective view showing the battery cell of FIG. 1.
Figure 5:
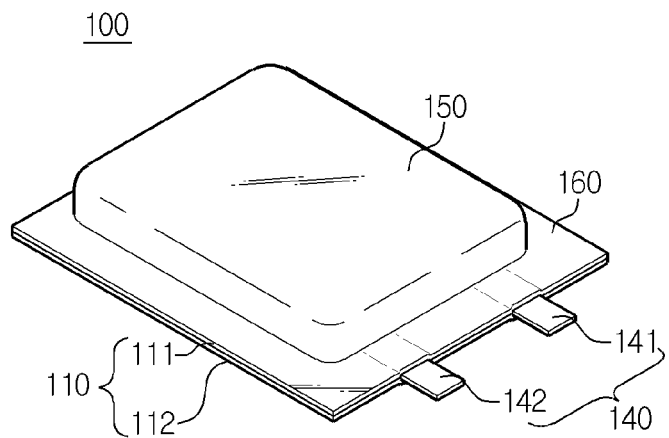
FIG. 5 is an assembled perspective view showing the battery cell of FIG. 1.

FIG. 4 is an exploded perspective view showing the battery cell of FIG. 1, and FIG. 5 is an assembled perspective view showing the battery cell of FIG. 1.

Referring to FIGS. 4 and 5, the battery cell 100 includes a case 110, an electrode assembly 120, an electrode tab 130 and an electrode lead 140.

The case 110 has an accommodation space 151. Inside the case 110, an electrode assembly 120 and an electrolyte, explained later, are positioned. A central region of the case 110 is provided to protrude upward. The case 110 includes an upper pouch 111 and a lower pouch 112.

The upper pouch 111 and the lower pouch 112 are combined with each other to form the accommodation space 151. A central region of the upper pouch 111 has a concave shape protruding upward. The lower pouch 112 is located under the upper pouch 111 in the third direction 16.

Even though the accommodation space is formed only in the upper pouch 111 in the above embodiment, the accommodation space 151 of the case 110 may also be formed in the lower pouch 112, different from the above. As an alternative, the accommodation space 151 may also be formed in both the upper pouch 111 and the lower pouch 112.

The upper pouch 111 and the lower pouch 112 respectively have a sealing portion 160. The sealing portion 160 of the upper pouch 111 and the sealing portion 160 of the lower pouch 112 may be provided to face each other. The sealing portion 160 of the upper pouch 111 and the sealing portion 160 of the lower pouch 112 may be bonded to each other by thermal bonding or the like. The accommodation space 151 may be sealed by bonding the sealing portions 160.

An electrolyte and an electrode assembly 120 are accommodated in the accommodation space 151 of the case 110. The case 110 may have an outer insulating layer, a metal layer, and an inner adhesive layer. The outer insulating layer may prevent exterior moisture, gas or the like from penetrating therein. The metal layer may improve the mechanical strength of the case 110. The metal layer may be made of aluminum. Alternatively, the metal layer may be made of any one selected from an alloy of iron, carbon, chromium and manganese, an alloy of iron and nickel, aluminum or equivalents thereof. When the metal layer uses a material containing iron, mechanical strength may be enhanced. When the metal layer is made of aluminum, good ductility may be ensured. Aluminum is a desired material of the metal layer. The outer insulating layer and the inner adhesive layer may be made of a polymer material.

The electrode assembly 120 includes a positive electrode plate, a negative electrode plate, and a separator. The electrode assembly 120 may be configured so that at least one positive electrode plate and at least one negative electrode plate are disposed with a separator being interposed therebetween. The electrode assembly 120 may be configured so that a plurality of positive electrode plates and a plurality of negative electrode plates are alternately stacked. Alternatively, the electrode assembly 120 may also be configured so that one positive electrode plate and one negative electrode plate are wound.

The electrode plate of the electrode assembly 120 includes a current collector and active material slurry coated on one or both sides of the current collector. The active material slurry may be formed by stirring a solvent in a state where a granular active material, an auxiliary conductor, a binder, and a plasticizer are added thereto. Each electrode plate may have an uncoated portion corresponding to a region where the active material slurry is not coated. In the uncoated portion, an electrode tab 130 corresponding to each electrode plate may be formed.

The electrode tab 130 is extended to protrude from the electrode assembly 120. The electrode tab 130 includes a positive electrode tab 131 and a negative electrode tab 132. The positive electrode tab 131 may extend from the uncoated portion of the positive electrode plate, and the negative electrode tab 132 may extend from the uncoated portion of the negative electrode plate.

One positive electrode tab 131 and one negative electrode tab 132 may be provided in the battery cell 100, respectively. Alternatively, a plurality of positive electrode tabs 131 and a plurality of negative electrode tabs 132 may also be provided. For example, if one positive electrode plate and one negative electrode plate are included in the electrode assembly 120 of the battery cell 100, one positive electrode tab 131 and one negative electrode tab 132 may be included. Alternatively, a plurality of positive electrode tabs 131 and a plurality of negative electrode tabs 132 may be included, respectively. If a plurality of positive electrode plates and a plurality of negative electrode plates are included in the electrode assembly 120, a plurality of positive electrode tabs 131 and a plurality of negative electrode tabs 132 may be included, and one electrode tab 130 may be provided to one electrode plate.

The electrode lead 140 may electrically connect the battery cell 100 to other external devices. The electrode lead 140 may include a positive electrode lead 141 and a negative electrode lead 142. The electrode lead 140 may be provided to extend from the inside to the outside of the pouch case 110. A portion of the electrode lead 140 may be interposed between the sealing portions 160. The electrode lead 140 is connected to the electrode tab 130. The electrode lead 140 of the present disclosure may include both the positive electrode lead 141 and the negative electrode lead 142 at one side of the case 110.

The battery cell 100 has an accommodation portion 150 and a sealing portion 160. Here, the accommodation portion 150 is a portion where the electrode assembly 120 is accommodated in the battery cell 100. The sealing portion 160 is sealing portions at four sides of the case 110 surrounding the accommodation portion 150.

Referring to FIGS. 1 to 3 again, the connection member 200 may electrically connect the battery cells 100 of the first battery group 101 and the battery cells 100 of the second battery group 102. The connection member 200 may be located between the first battery group 101 and the second battery group 102. The first battery group 101, the connection member 200 and the second battery group 102 may be disposed in order side by side along the second direction 14. The connection member 200 may be provided so that its length elongates in the first direction 12. The first battery group 101 and the second battery group 102 may be located symmetrically based on the connection member 200.

The electrode leads 140 of the battery cells 100 of the first battery group 101 may be coupled to the connection member 200. In addition, the electrode leads 140 of the battery cells 100 of the second battery group 102 may be coupled to the connection member 200. For example, an electrode lead 140 of any one battery cell 100 of the first battery group 101 may be in contact with any one of an upper surface 201 and a lower surface 202 of the connection member 200.

An electrode lead 140 of a battery cell 100 of the second battery group 102, which is located to face any one battery cell 100 of the first battery group 101, may be in contact with the other one of the upper surface 201 and the lower surface 202 of the connection member 200.

Here, any one battery cell 104 of the first battery group 101 is defined as a first battery cell 104. Also, the battery cell 103 of the second battery group 102 located to face the first battery cell 104 is defined as a second battery cell 103.

Figure 6:
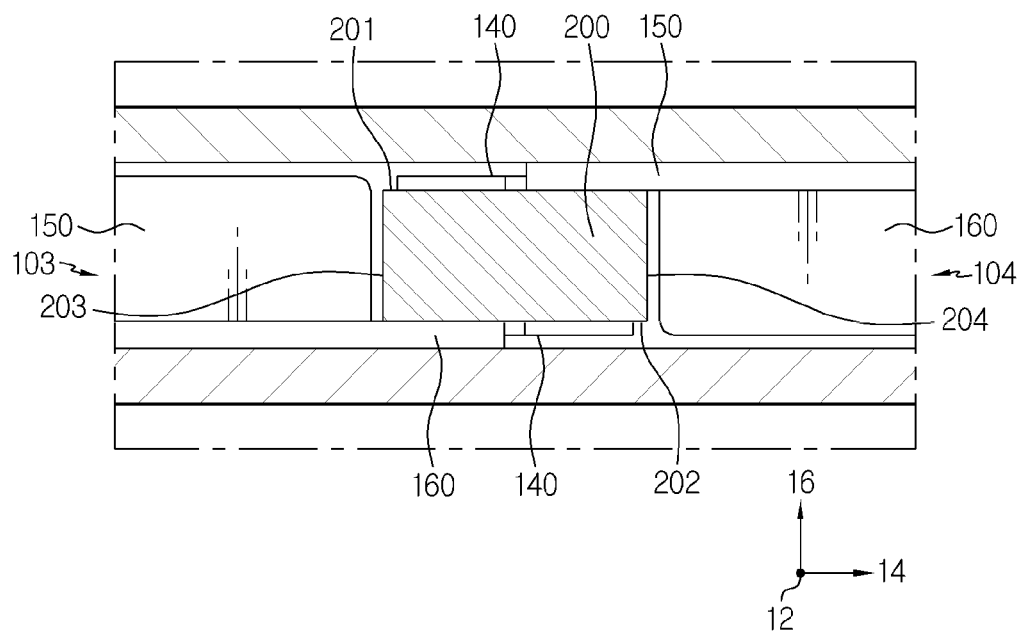
FIG. 6 is a cross-sectional view showing the battery module of FIG. 2, observed in the A-A direction.

FIG. 6 is a cross-sectional view showing the battery module of FIG. 2, observed in the A-A direction. Hereinafter, referring to FIG. 6, the connection relationship of the connection member 200 and the battery cells 100 will be described in detail.

The connection member 200 may be located between the first battery cell 104 and the second battery cell 103. The electrode lead 140 of the first battery cell 104 may be in contact with the lower surface 202 of the connection member 200. The electrode lead 140 of the second battery cell 103 may be in contact with the upper surface 201 of the connection member 200. For example, the electrode lead 140 of the first battery cell 104 and the electrode lead 140 of the second battery cell 103 may be provided above and below the connection member 200 in the third direction 16. The electrode lead 140 of the first battery cell 104 and the electrode lead 140 of the second battery cell 103 may be located so that at least a part of surfaces thereof face each other based on the connection member 200.

Though not shown in the figures, the battery cells 100 respectively connected to the connection member 200 may be connected in series or in parallel. For example, the positive electrode leads of the battery cells 100 connected to the connection member 200 may be connected through a single connection portion (not shown) in the connection member 200. In addition, the negative electrode leads of the battery cell 100 connected to the connection member 200 may be connected through a single connection portion (not shown) in the connection member 200. As an alternative, electrode leads 140 of neighboring battery cells 100 may be connected in series through a separate connection portion (not shown) in the connection member 200.

If the electrode lead 140 of the first battery cell 104 and the electrode lead 140 of the second battery cell 103 are contacted and coupled to the upper and lower surfaces 201, 202 of the connection member 200, respectively, the space required for coupling may be reduced, compared to the case where the electrode lead 140 is bent and coupled in a separate space. In this case, the space required for electrically connecting the electrode leads 140 is reduced at the battery module 10, which may improve the energy volume efficiency of the battery module 10.

At least a part of the lower surface 202 of the connection member 200 may be in contact with the sealing portion 160 of the first battery cell 104. At least a part of the upper surface 201 of the connection member 200 may be in contact with the sealing portion 160 of the second battery cell 103.

Both ends 203, 204 of the connection member 200 in the second direction 14 may be located spaced apart from the accommodation portion 150 of the battery cell 100 by a predetermined distance, respectively. For example, one end 203 of the connection member 200 in the second direction 14 may be located spaced apart from the accommodation portion 150 of the first battery cell 104. The other end 204 of the connection member 200 in the second direction 14 may be located spaced apart from the accommodation portion 150 of the second battery cell 103.

The battery cells 100 connected to each other through the connection member 200 may have the accommodation space 151 in different pouches thereof. For example, the first battery cell 104 and the second battery cell 103 may be located rotationally symmetrically based on the connection member 200. For example, the first battery cell 104 may be located so that the accommodation space 151 is formed in the upper pouch 111 thereof. The second battery cell 103 may be located so that the accommodation space 151 is formed in the lower pouch 112 thereof. Here, the upper pouch 111 and the lower pouch 112 of the first battery cell 104 and the second battery cell 103 are defined so that a pouch located in an upper portion in the third direction 16 of FIG. 6 is the upper pouch 111, and a pouch located in a lower portion in the third direction 16 is the lower pouch 112.

As described above, the battery cells 100 facing each other in the second direction 14 based on the connection member 200 are provided rotationally symmetrically, thereby minimizing the empty space in the battery module 10. Since the empty space in the battery module 10 is minimized, the energy volume efficiency of the battery module 10 may be improved. In addition, the empty space between the battery cells 100 may be utilized to the maximum by allowing the electrode leads 140 to respectively contact the upper and lower surfaces 201, 202 of the connection member 200 located between the battery modules 10 and also allowing the connection member 200 to be located in a space above the sealing portion 160 of each battery cell 100. By doing so, the energy volume efficiency of the battery module 10 may be improved.

Figure 7:
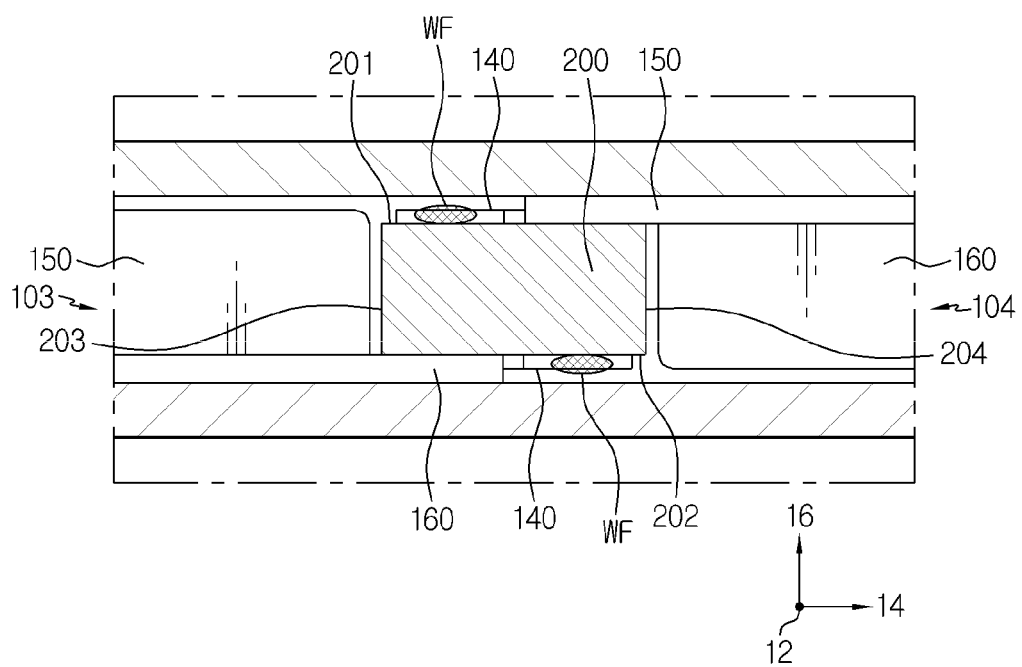
FIG. 7 is a diagram showing a welding face of the connection member and the electrode lead of FIG. 6.

FIG. 7 is a diagram showing a welding face of the connection member and the electrode lead of FIG. 6.

Referring to FIG. 7, the connection member 200 and the electrode lead 140 may be coupled by means of welding. The electrode lead 140 of the first battery cell 104 is in contact with the lower surface 202 of the connection member 200 and may be coupled thereto by welding. The electrode lead 140 of the second battery cell 103 is in contact with the upper surface 201 of the connection member 200 and may be coupled thereto by welding.

A welding face (WF) of the connection member 200 and the electrode lead 140 may be located in a region which faces the sealing portion 160 of the battery cell 100. For example, the welding face (WF) of the electrode lead 140 of the first battery cell 104 and the connection member 200 may be located in a region which faces the sealing portion 160 of the first battery cell 104 located in an upper portion in the third direction 16. The welding face (WF) of the electrode lead 140 of the second battery cell 103 and the connection member 200 may be located in a region which faces the sealing portion 160 of the second battery cell 103 located in a lower portion in the third direction 16. In other words, the sealing portion 160 of the battery cell 100, the connection member 200 and the welding face (WF) may be located to be stacked up and down in the third direction 16.

The welding may be performed using various known welding methods, for example ultrasonic welding, laser welding or the like.

In the present disclosure, when the connection member 200 and the electrode lead 140 are coupled, the electrode leads 140 come into contact with the upper and lower surfaces 201, 202 of the connection member 200 without being bent, and then are coupled thereto by welding, which ensures easy coupling between the connection member 200 and the electrode leads 140. In addition, the electrode leads 140 are contacted and coupled to the upper and lower surfaces 201, 202 of the connection member 200, which does not need a separate space for coupling the electrode leads 140, and thus the space required for coupling the electrode leads 140 may be minimized in the battery module 10. By doing so, the energy volume efficiency of the battery module 10 may be improved.

Referring to FIGS. 1 to 3 again, components of the battery module 10 may be located at the inside of the cell frame 300. The cell frame 300 may protect the battery cells 100 therein against an external impact.

The cell frame 300 has an inner space. The first battery group 101, the connection member 200 and the second battery group 102 may be located in the inner space. The first battery group 101, the connection member 200 and the second battery group 102 may be located in order along the second direction 14.

The cell frame 300 may be provided in a rectangular parallelepiped shape as a whole. The cell frame 300 may be made of a material with excellent thermal conductivity and good rigidity. The cell frame 300 may be made of metal. For example, the cell frame 300 may be made of aluminum. A part of inner sides of the cell frame 300 may be in contact with the battery cell 100. The cell frame 300 may be in contact with the battery cell 100 to receive the heat generated from the battery cell 100 and discharge the heat to the outside. In other words, the cell frame 300 may be made of a material with excellent thermal conductivity and discharge the heat generated at the battery cell 100 to the outside, thereby cooling the battery cell 100.

The cell frame 300 has an upper body 310 and a lower body 320. The upper body 310 may have a rectangular shape, when being observed from the above. The upper body 310 may have an empty space therein. An inner surface of the upper body 310 located at an upper portion in the third direction 16 may be in contact with the surface of the battery cells 100 of the first battery group 101 and the surface of the battery cells 100 of the second battery group 102.

The lower body 320 may be located below the upper body 310 in the third direction 16. The lower body 320 may have an empty space. The upper body 310 and the lower body 320 may be combined with each other to form an inner space. An inner surface of the lower body 320 located at a lower portion in the third direction 16 may be in contact with the surface of the battery cells 100 of the first battery group 101 and the battery cells 100 of the second battery group 102.

A part of the inner surfaces of the upper body 310 and the lower body 320 may come into contact with the battery cells 100 to emit the heat generated at the battery cells 100. In other words, the cell frame 300 may cool the battery cells 100.

The connector 400 may electrically connect the battery module 10 to an external electric device. The connector 400 may be connected to the connection member 200. For example, the connector 400 may be provided in a pair. The pair of connectors 400 may be respectively connected to both ends of the connection member 200 in the first direction 12. The pair of connectors 400 may be formed through the lower body 320 of the cell frame 300.

Figure 8:
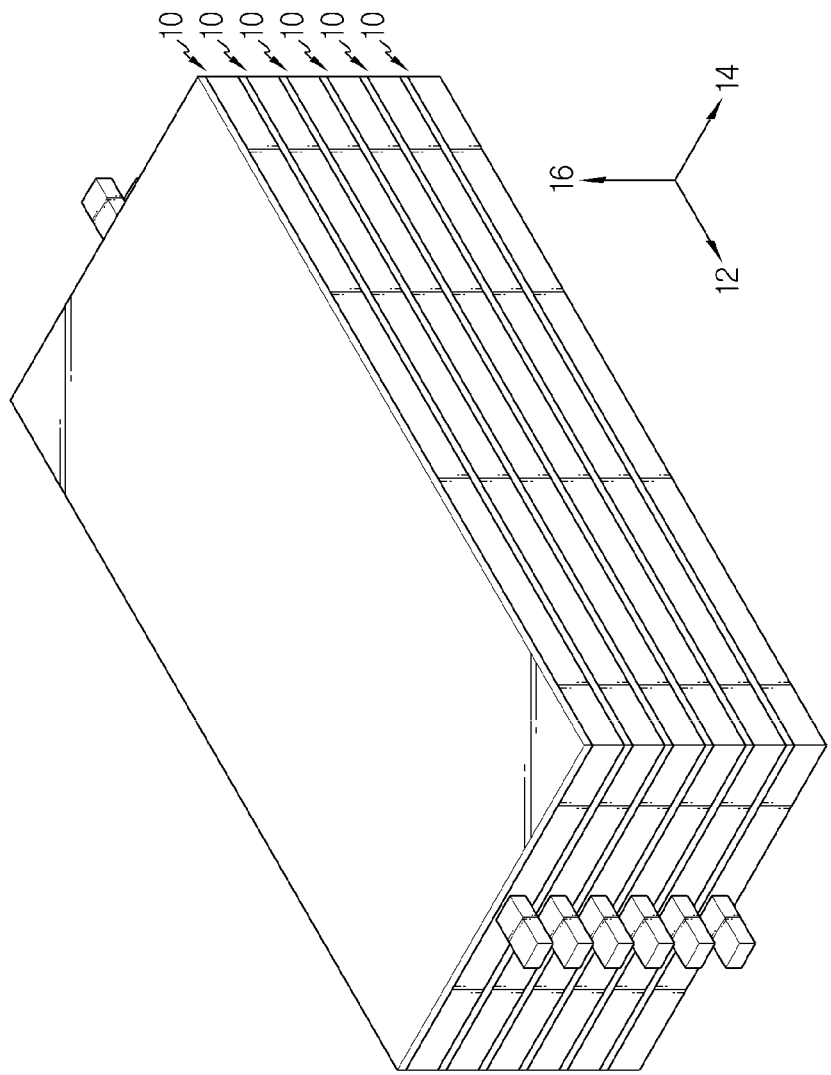
FIG. 8 is a perspective view showing a battery module according to another embodiment of the present disclosure.

FIG. 8 is a perspective view showing a battery module 10 according to another embodiment of the present disclosure. Referring to FIG. 8, a plurality of battery modules 10 of the present disclosure as depicted in FIG. 1 may be stacked in one direction. If a plurality of battery modules 10 of FIG. 1 are provided, the battery module 10 may have an increased energy capacity.

The battery pack according to the present disclosure may include at least one battery module 10 described above. In addition to the battery module 10, the battery pack may further include a pack case for accommodating the battery module 10, and various devices for controlling charge/discharge of the battery module 10. For example, a battery management system (BMS), a current sensor, a fuse, and the like may be further included.

The battery module 10 according to the present disclosure may be applied to vehicles such as electric vehicles and hybrid vehicles. The vehicle according to the present disclosure may include at least one battery pack including the battery module 10 according to the embodiment in the present disclosure.

As described above, in the battery module 10 of the present disclosure, the electrode leads 140 of the battery cells 100 may be located to face each other. In addition, the electrode leads 140 of the battery cells 100 may be coupled to the connection member 200 located between the first battery group 101 and the second battery group 102. By utilizing the space between the battery cells 100 to the maximum as described above, it is possible to minimize the space required for coupling the electrode leads 140 in the battery module 10. By doing so, the energy volume efficiency of the battery module 10 may be improved.

The above description is illustrative of the present disclosure. Also, the above disclosure is intended to illustrate and explain the preferred embodiments of the present disclosure, and the present disclosure may be used in various other combinations, modifications, and environments. In other words, the present disclosure may be changed or modified within the scope of the concept of the invention disclosed herein, within the equivalent scope of the disclosure, and/or within the skill and knowledge of the art. The described embodiments illustrate the best state of the art to implement the technical idea of the present disclosure, and various changes may be made thereto as being demanded for specific applications and uses of the present disclosure. Accordingly, the above description is not intended to limit the present disclosure to the embodiments. Also, the appended claims should be construed as encompassing such other embodiments.

What is claimed is:

1. A battery module, comprising:
a plurality of battery cells, each having an electrode assembly, a case for accommodating the electrode assembly, and an electrode lead composed of a positive electrode lead and a negative electrode lead connected to the electrode assembly and exposed out of the case; and
a connection member configured to electrically connect the battery cells,
wherein the plurality of battery cells are classified into a first battery group having battery cells disposed side by side in a first direction and a second battery group having battery cells disposed side by side in the first direction so that electrode leads of the battery cells thereof face electrode leads of the battery cells of the first battery group,
wherein the connection member is located between the first battery group and the second battery group,
wherein the electrode leads of the battery cells are connected to the connection member, respectively,
wherein an electrode lead of any one battery cell of the first battery group is in contact with any one of an upper surface and a lower surface of the connection member, and
wherein an electrode lead of a battery cell of the second battery group, which is located to face the any one battery cell, is in contact with the other one of the upper surface and the lower surface of the connection member.

2. The battery module according to claim 1,
wherein the battery cell includes an accommodation portion in which the electrode assembly is accommodated and a sealing portion for sealing the accommodation portion,
wherein the connection member and the electrode lead are coupled by means of welding, and
wherein a welding face of the connection member and the electrode lead is located in a region facing the sealing portion.

3. The battery module according to claim 2,
wherein the welding face of the electrode lead of the any one battery cell and the connection member is located in a region facing the sealing portion of the other battery cell.

4. The battery module according to claim 3,
wherein the welding face of the electrode lead of the other battery cell and the connection member is located in a region facing the sealing portion of the any one battery cell.

5. The battery module according to claim 1,
wherein the case includes an upper pouch and a lower pouch whose rim portions are sealed to each other, and the accommodation space for accommodating the electrode assembly is formed in any one of the upper pouch and the lower pouch, and wherein in case of battery cells connected to each other by the connection member, the accommodation space is formed in different pouches.

6. The battery module according to claim 1, wherein the positive electrode lead and the negative electrode lead of the battery cell are exposed at the same side of the case, and at least the positive electrode lead and the negative electrode lead of the any one battery cell are located so that a partial region of surfaces thereof faces the positive electrode lead and the negative electrode lead of the other battery cell, based on the connection member.

7. The battery module according to claim 2, wherein both ends of the connection member in a second direction, which is perpendicular to the first direction when being observed from the above, are spaced apart by a predetermined distance from the accommodation portions of both battery cells connected to each other by the connection member.

8. The battery module according to claim 2, wherein at least a part of the lower surface of the connection member is in contact with one surface of the sealing portion of the any one battery cell, and at least a part of the upper surface of the connection member is in contact with one surface of the sealing portion of the facing battery cell.

9. The battery module according to claim 1, wherein the battery module has an inner space, and a cell frame is further provided so that the first battery group, the second battery group and the connection member are located in the inner space.

10. A battery pack, comprising a battery module defined in claim 1.

11. A vehicle, comprising a battery pack defined in claim 10.

* * * * *